US012633705B2

(12) United States Patent
Wakimoto

(10) Patent No.: US 12,633,705 B2
(45) Date of Patent: May 19, 2026

(54) WIRE HARNESS

(71) Applicant: SUMITOMO WIRING SYSTEMS, LTD., Yokkaichi (JP)

(72) Inventor: Isao Wakimoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 310 days.

(21) Appl. No.: 18/546,424

(22) PCT Filed: Feb. 14, 2022

(86) PCT No.: PCT/JP2022/005736
§ 371 (c)(1),
(2) Date: Aug. 14, 2023

(87) PCT Pub. No.: WO2022/176812
PCT Pub. Date: Aug. 25, 2022

(65) Prior Publication Data

US 2024/0136772 A1 Apr. 25, 2024
US 2024/0235124 A9 Jul. 11, 2024

(30) Foreign Application Priority Data

Feb. 16, 2021 (JP) ................................ 2021-022759

(51) Int. Cl.
*H01R 13/6581* (2011.01)
*H01R 4/34* (2006.01)
*H01R 13/64* (2006.01)
*H01R 13/74* (2006.01)

(52) U.S. Cl.
CPC ........... *H01R 13/6581* (2013.01); *H01R 4/34* (2013.01); *H01R 13/64* (2013.01); *H01R 13/748* (2013.01)

(58) Field of Classification Search
CPC ............ H01R 13/6581; H01R 13/6583; H01R 13/5202; H01R 13/5205; H01R 13/648; H01R 13/748; H01R 13/64
USPC ..................................................... 439/607.01
See application file for complete search history.

(56) References Cited

U.S. PATENT DOCUMENTS 8,790,137 B2 * 7/2014 Deno .................. H01R 13/648 439/607.41
9,806,454 B2 * 10/2017 Nakai ................ H01R 13/5205
2010/0216323 A1 * 8/2010 Kawamura ........ H01R 13/6593 439/95

(Continued)

FOREIGN PATENT DOCUMENTS

JP 2015005432 A 1/2015
JP 2019212583 A 12/2019

*Primary Examiner* — Tho D Ta
*Assistant Examiner* — Gregory L Mangot

(57) ABSTRACT

A wire harness includes a resin housing that includes a holding part that holds a terminal and an electric wire and a hood part that has an opening that exposes the terminal there inside, a metal shield shell that covers the holding part and is fixed to a case of an apparatus, and a metal bracket that covers the holding part and is attached to the shield shell. The shield shell opens toward the case and covers the holding part from the side opposite the case. The bracket has a cylindrical part through which the holding part is inserted, and a protruding piece that protrudes from the cylindrical part toward the hood part and is positioned on the side opposite the shield shell with the holding part therebetween.

7 Claims, 4 Drawing Sheets

(56) References Cited

U.S. PATENT DOCUMENTS

| | | | |
|---|---|---|---|
| 2016/0329651 | A1 | 11/2016 | Yamaguchi et al. |
| 2021/0104829 | A1 | 4/2021 | Miyamoto |

* cited by examiner

WIRE HARNESS

BACKGROUND

Field of the Disclosure

The present disclosure relates to a wire harness.

Related Art

A known wire harness electrically connects vehicle devices to each other (for example, refer to International Publication No. WO2018/186338). WO2018/186338 discloses a wire harness that includes terminals arranged next to one another, electric wires connected to the terminals, a housing holding the terminals and the electric wires, and a shield shell covering the housing and fixed to a case of a device.

The housing includes a tubular hood and a holder projecting from an outer side of the hood. The hood includes an opening in which the terminals are exposed. The holder holds the terminals and the electric wires.

The shield shell is open toward the case and covers the hood and the holder at a side opposite to the case.

In such a wire harness, a tubular bracket is attached to the shield shell. The holder is inserted into the bracket. The portion of the holder covered by the bracket and the portion of the holder covered by the shield shell are located adjacent to each other at opposite sides of the hood.

SUMMARY

When attaching such a wire harness to a device, the terminals are first electrically connected to mating terminals of the device. Then, the shield shell, to which the bracket is attached, is fixed to the case by bolts.

Here, the bracket covers the entire periphery of the holder of the housing. The shield shell covers the side of the holder of the housing that is opposite to the case and does not cover the case side of the holder. Therefore, when attaching the wire harness, the housing will easily pivot about the bracket, and the shield shell may be displaced from its correct position on the housing. Thus, when fixing the shield shell to the case, an operator will need to visually align the shield shell with the case. Such an alignment task will decrease the working efficiency when attaching the wire harness.

It is an objective of the present disclosure to avoid decreases in working efficiency when attaching the wire harness.

A wire harness according to the present disclosure includes terminals, electric wires, a resin housing, a metal shield shell, and a metal bracket. The terminals are arranged next to one another and electrically connected to mating terminals arranged on a device. The electric wires are connected to the terminals. The resin housing includes a hood and a holder. The hood includes an opening in which the terminals are exposed. The holder projects from the hood toward an outer side of the hood and holds the terminals and the electric wires. The metal shield shell covers the holder and is fixed to a case of the device. The metal bracket covers the holder and is attached to the shield shell. The shield shell is open toward the case and covers a side of the holder opposite to the case. The bracket includes a tubular portion into which the holder is inserted, and a projecting piece projecting from the tubular portion toward the hood at a side of the holder opposite to the shield shell so that the holder is located between the projecting piece and the shield shell.

According to the present disclosure, it is possible to avoid decreases in working efficiency when attaching the wire harness.

DETAILED DESCRIPTION

Figure 1:
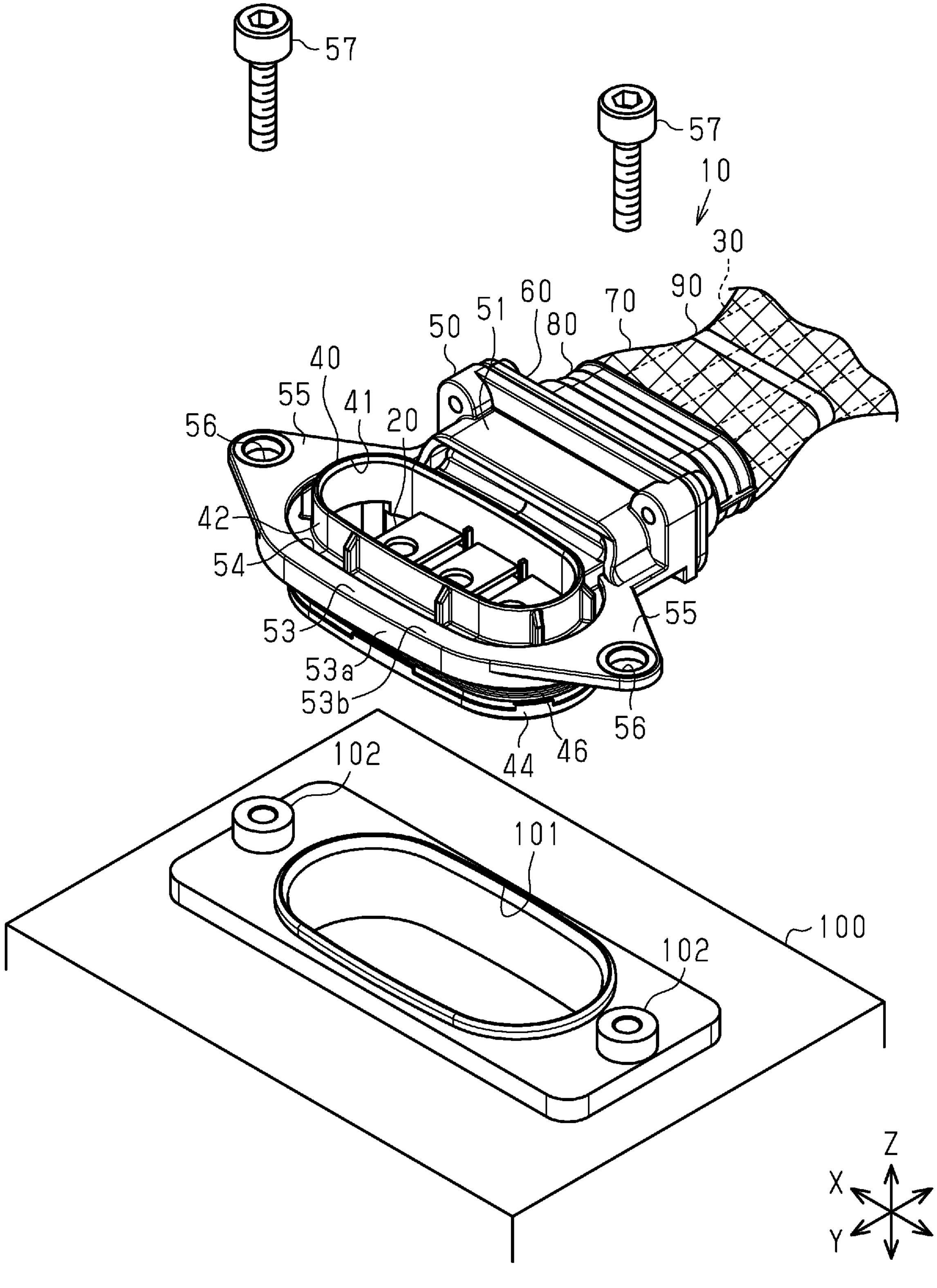
FIG. 1 is a perspective view of a wire harness according to an embodiment.

Description of Embodiments of the Present Disclosure

Embodiments of the present disclosure will first be listed and described.

[1] A wire harness according to the present disclosure includes terminals, electric wires, a resin housing, a metal shield shell, and a metal bracket. The terminals are arranged next to one another and electrically connected to mating terminals arranged on a device. The electric wires are connected to the terminals. The resin housing includes a hood and a holder. The hood includes an opening in which the terminals are exposed. The holder projects from the hood toward an outer side of the hood and holds the terminals and the electric wires. The metal shield shell covers the holder and is fixed to a case of the device. The metal bracket covers the holder and is attached to the shield shell. The shield shell is open toward the case and covers a side of the holder opposite to the case. The bracket includes a tubular portion into which the holder is inserted, and a projecting piece projecting from the tubular portion toward the hood at a side of the holder opposite to the shield shell so that the holder is located between the projecting piece and the shield shell.

With this structure, the projecting piece of the bracket is located at the side of the holder of the housing opposite to the shield shell so that the holder is in between. Thus, the projecting piece easily restricts pivoting of the housing about the bracket. More specifically, displacement of the shield shell relative to the housing is restricted. Therefore, decreases in working efficiency when attaching the wire harness are limited.

[2] Preferably, the terminals are arranged next to each other in an arrangement direction, and the projecting piece extends across the terminals in the arrangement direction.

With this structure, the projecting piece covers each terminal in the portion of the holder facing the case, that is, the portion exposed from the shield shell. This improves the electromagnetic shielding property of the wire harness.

[3] Preferably, each of the terminals includes an insertion hole that extends through the terminal in an opening direction of the opening for insertion of a bolt used for connection with a corresponding one of the mating terminals.

Connection of the terminal and the mating terminal with the bolt fastens the bolt, inserted into the terminal, to the mating terminal and produces a force acting on the terminal toward the mating terminal. Thus, the housing, holding the terminals, acts to move away from the shield shell. Even in such a structure, in the present disclosure, the projecting piece of the bracket is located at the side of the holder of the housing opposite to the shield shell so that the holder is in between. This effectively restricts pivoting of the housing about the bracket.

[4] Preferably, a braided member is formed by braiding conductive wires, and the braided member covers a periphery of the electric wires and is attached to the bracket.

With such a structure, the braided member covers the periphery of the electric wires, and electromagnetically shields the electric wires.

[5] Preferably, the wire harness includes a fixing member that fixes the braided member to the electric wires.

With such a structure, the braided member is fixed to the electric wires by the fixing member. Here, the electric wires are held by the housing, and the braided member is attached to the bracket, which is attached to the shield shell. Thus, the housing and the shield shell are coupled to each other by the electric wires, the braided member, and the bracket. This limits displacement of the shield shell relative to the housing. Therefore, decreases in working efficiency when attaching the wire harness are further limited.

Detail of Embodiment of Present Disclosure

A specific example of a wire harness of the present disclosure will now be described with reference to the drawings. In the drawings, structures may be partially exaggerated or simplified to facilitate illustration. In addition, elements have not necessarily been drawn to scale in the drawings. The present disclosure is not limited to these examples. The scope of the present disclosure and equivalence of the present disclosure are to be understood with reference to the appended claims. In the present specification, the term “orthogonal” does not mean strictly orthogonal and includes substantially orthogonal within a range that results in the same advantages as the present embodiment.

Structure of Wire Harness 10

Figure 2:
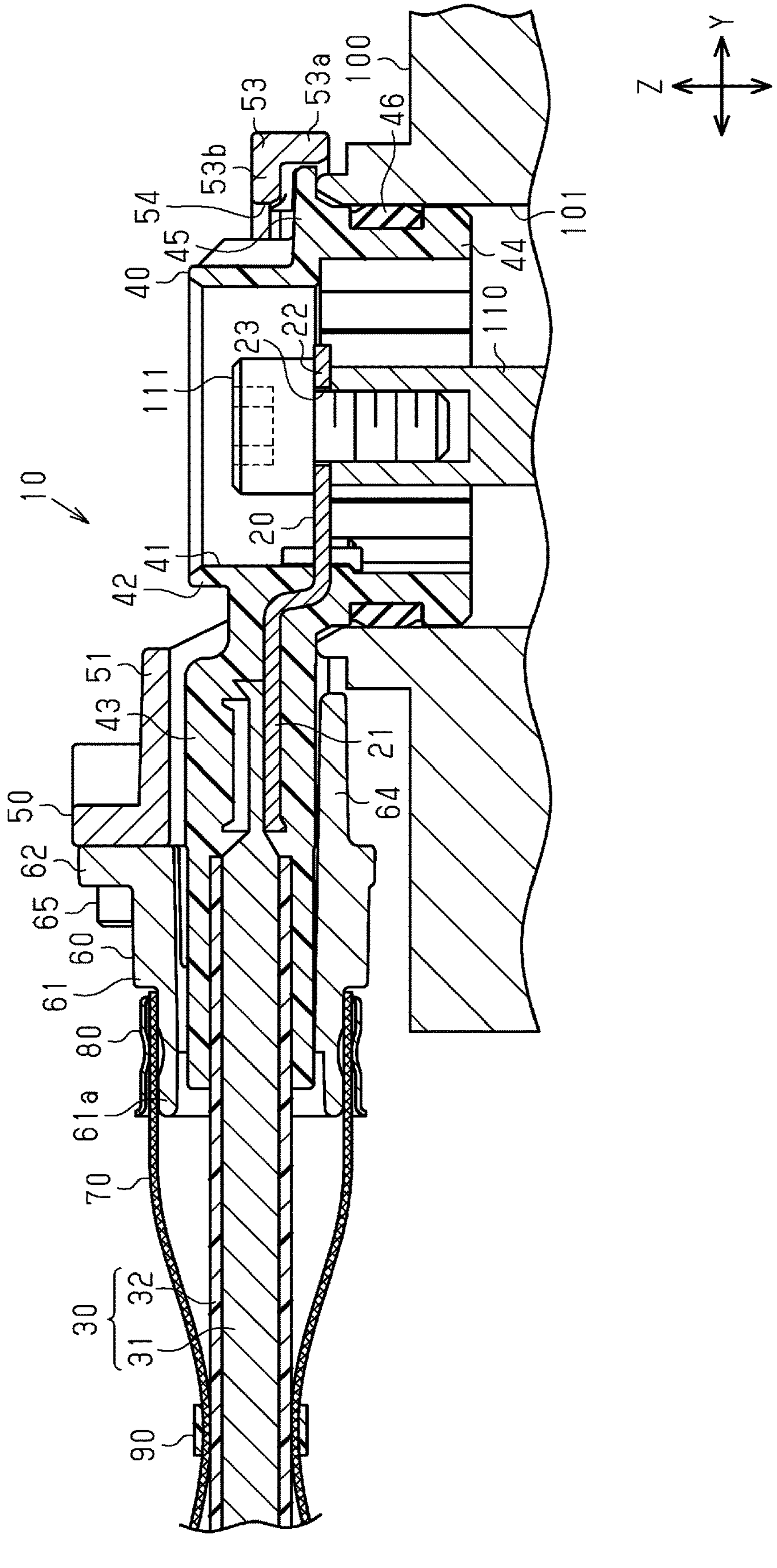
FIG. 2 is a cross-sectional view of a wire harness according to the embodiment.

As shown in FIGS. 1 and 2, a wire harness 10 electrically connects vehicle devices such as a motor and an inverter. The wire harness 10 is attached to a case 100 of a device including an opening 101. Metal mating terminals 110 are arranged inside the case 100.

The wire harness 10 includes terminals 20 arranged next to one another, electric wires 30 connected to the terminals 20, and a housing 40 holding the terminals 20 and the electric wires 30. The wire harness 10 includes, for example, three terminals 20 and three electric wires 30. The electric wires 30 extend out of the housing 40.

The terminals 20 are arranged next to one another in an arrangement direction of the terminals 20. Hereinafter, the arrangement direction of the terminals 20 will be referred to as the X-axis direction, the direction in which the electric wires 30 extend out of the housing 40 will be referred to as the Y-axis direction, and the direction orthogonal to both the X-axis direction and the Y-axis direction will be referred to as the Z-axis direction. The X-axis direction, the Y-axis direction, and the Z-axis direction are orthogonal to one another.

The wire harness 10 includes a shield shell 50 covering the housing 40 and a bracket 60 attached to the shield shell 50. The wire harness 10 includes a braided member 70 that covers the bracket 60, a crimping ring 80 that attaches the braided member 70 to the bracket 60, and a fixing member 90 that fixes the braided member 70 to the electric wires 30.

Structure of Terminal 20

As shown in FIG. 2, each terminal 20 includes a wire connection portion 21 and a terminal connection portion 22. The terminal 20 is a single component formed integrally by the wire connection portion 21 and the terminal connection portion 22. The material of the terminal 20 may be a metal material, for example, an iron-based material, a copper-based material, or an aluminum-based material.

An electric wire 30 is electrically connected to the wire connection portion 21. The wire connection portion 21 is, for example, crimped and connected to the electric wire 30.

The terminal connection portion 22 has, for example, the form of a plate. The terminal connection portion 22 extends in the Y-axis direction from the wire connection portion 21. The terminal connection portion 22 includes an insertion hole 23 for insertion of a bolt 111. The insertion hole 23 extends through the terminal connection portion 22 in the Z-axis direction. The terminal connection portions 22 are electrically connected to the mating terminals 110, which are arranged inside the case 100, by the bolts 111 inserted into the insertion holes 23.

Structure of Electric Wire 30

Each electric wire 30 includes a wire core 31 and an insulating coating 32 that coats the outer surface of the wire core 31. The wire core 31 is exposed from the insulating coating 32 at an end of the electric wire 30. The wire core 31 exposed from the insulating coating 32 is connected to the wire connection portion 21 of the terminal 20.

Structure of Housing 40

Figure 3:
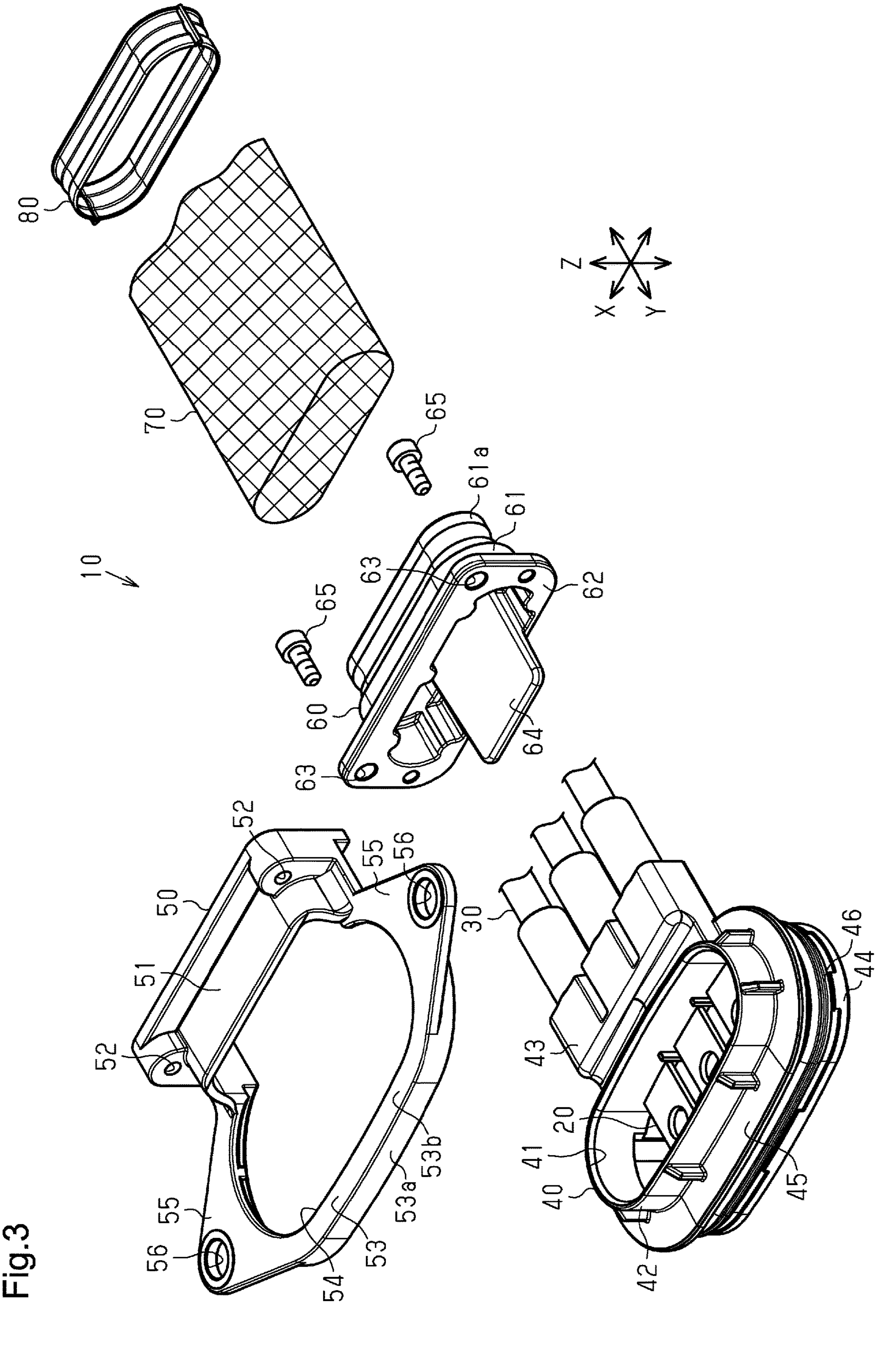
FIG. 3 is an exploded perspective view of a wire harness according to the embodiment.

As shown in FIGS. 2 and 3, the housing 40 includes a tubular hood 42 and a holder 43 projecting out of the hood 42 from the outer surface of the hood 42. The material of the housing 40 may be, for example, a resin material such as polybutylene terephthalate (PBT).

The hood 42 includes an opening 41 in which the terminal connection portion 22 of each terminal 20 is exposed. The opening 41 extends through the hood 42 in the Z-axis direction. The opening 41 is oval and elongated in the X-axis direction.

One end of the hood 42 in the Z-axis direction includes a tubular insertion portion 44 that is inserted into the opening 101 of the case 100. An annular sealing member 46, made of an elastic material such as rubber, is arranged on the outer circumferential surface of insertion portion 44. The sealing member 46 seals the gap between the insertion portion 44 and the opening 101 of the case 100.

The housing 40 has a flange 45 extending from the hood 42 toward the outer side of the hood 42. The flange 45 extends from the hood 42 at a portion adjacent to the insertion portion 44 in the Z-axis direction, excluding the holder 43. The flange 45 is connected to the holder 43.

The holder 43 holds the terminals 20 and the electric wires 30. The terminals 20, the electric wires 30, and the housing 40 are integrated through insert molding. Each electric wire 30 extends out of one side of the holder 43 in the Y-axis direction.

Structure of Shield Shell 50

The shield shell 50 is open toward the case 100 and covers the side of the housing 40 opposite to the case 100. The shield shell 50 is not fixed to the housing 40. Therefore, the shield shell 50 is arranged so as to be movable relative to the housing 40.

As shown in FIG. 3, the shield shell 50 includes an attachment portion 51 that covers part of the holder 43, an enclosing portion 53 that surrounds the periphery of the hood 42, and two fixing portions 55 that are fixed to the case 100. The bracket 60 is attached to the attachment portion 51.

The attachment portion 51, the enclosing portion 53, and the fixing portions 55 are integrated. The material of the shield shell 50 may be, for example, a metal material such as an iron-based material or an aluminum-based material. The shield shell 50 of the present embodiment is formed of an aluminum alloy.

The attachment portion 51 covers the side of the holder 43 opposite to the case 100 in the Z-axis direction. The attachment portion 51 covers portions of the holder 43 at the side opposite to the case 100 in the Z-axis direction and at the two sides in the X-axis direction. The attachment portion 51 is C-shaped in its entirety.

The two ends of the attachment portion 51 in the X-axis direction include two threaded holes 52 to which bolts 65 are fastened. The threaded holes 52 extend through the attachment portion 51 in the Y-axis direction.

The enclosing portion 53 includes an insertion hole 54 into which the hood 42 is inserted. The insertion hole 54 extends through the enclosing portion 53 in the Z-axis direction. The insertion hole 54 is oval and elongated in the X-axis direction.

The enclosing portion 53 includes a peripheral wall 53*a*, surrounding the periphery of the hood 42 and the flange 45, and a top wall 53*b*, extending from the entire peripheral wall 53*a* toward the inner side of the peripheral wall 53*a*.

The top wall 53*b* covers the side of the outer edge of the flange 45 opposite to the case 100 in the Z-axis direction. Thus, when viewed in the Z-axis direction, the top wall 53*b* overlaps the flange 45.

As shown in FIG. 1, each fixing portion 55 includes an insertion hole 56 into which a bolt 57 is inserted. The bolt 57 is inserted into the insertion hole 56 and fastened to a female threaded portion 102 of the case 100 to fix the shield shell 50 to the case 100.

Structure of Bracket 60

As shown in FIGS. 2 and 3, the bracket 60 covers the entire periphery of the holder 43. The bracket 60 is not fixed to the housing 40. Therefore, the bracket 60 is movable relative to the housing 40.

The bracket 60 includes a tubular portion 61 into which the holder 43 is inserted, an attachment portion 62 attached to the attachment portion 51 of the shield shell 50, and a projecting piece 64 projecting from the tubular portion 61. The material of the bracket 60 may be, for example, a metal material such as an iron-based material or an aluminum-based material. The bracket 60 of the present embodiment is formed of an aluminum alloy.

The tubular portion 61 covers the entire periphery of the portion of the holder 43 adjacent to the portion covered by the attachment portion 51 of the shield shell 50 in the Y-axis direction. The tubular portion 61 includes an end 61*a* to which the braided member 70 is attached.

As shown in FIG. 3, the attachment portion 62 projects outward from the entire periphery of the tubular portion 61 at the end opposite to the end 61*a*. The attachment portion 62 includes two insertion holes 63 into which the bolts 65 are inserted. The insertion holes 63 extend through the attachment portion 62 in the Y-axis direction. The bolts 65 are inserted into the insertion holes 63 and fastened to the threaded holes 52 of the shield shell 50 to attach the bracket 60 to the shield shell 50.

As shown in FIG. 2, the projecting piece 64 projects from the tubular portion 61 toward the hood 42 in the Y-axis direction. The projecting piece 64 and the attachment portion 51 of the shield shell 50 are located at opposite sides of the holder 43. A slight gap extends between the projecting piece 64 and the holder 43 in the Z-axis direction.

Figure 4:
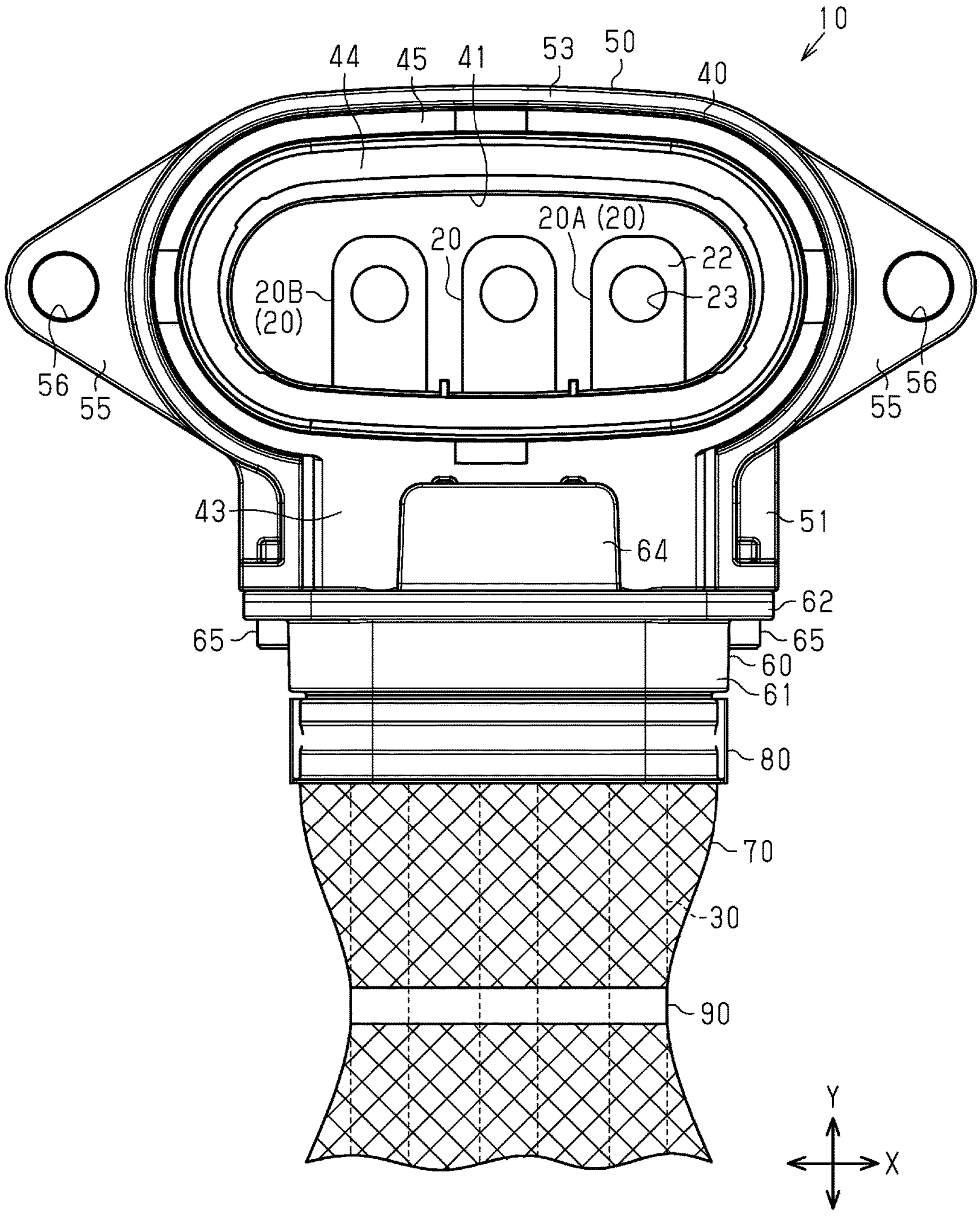
FIG. 4 is a rear view of a wire harness according to the embodiment.

As shown in FIG. 4, the projecting piece 64 extends across the terminals 20 in the X-axis direction. As viewed in the Z-axis direction, the projecting piece 64 overlaps each of the terminals 20.

Hereinafter, one of the terminals 20 located at the outermost side in the X-axis direction will be referred to as the terminal 20A, and the one of the terminals 20 located at the other outermost side in the X-axis direction will be referred to as the terminal 20B.

One end of the projecting piece 64 in the X-axis direction covers part of the terminal 20A in the X-axis direction. The other end of the projecting piece 64 in the X-axis direction covers part of the terminal 20B in the X-axis direction.

As shown in FIG. 2, each of the wire connection portions 21 of the terminals 20 is located between the attachment portion 51 of the shield shell 50 and the projecting piece 64. Therefore, each of the wire connection portions 21 is covered by the attachment portion 51 and the projecting piece 64.

Structure of Braided Member 70

As shown in FIGS. 1 to 3, the braided member 70 is formed by, for example, braiding conductive wires into a tubular shape. The braided member 70 may be a braided member formed by braiding multiple types of metal wires or a braided member formed by braiding metal wires and resin wires. The material of the metal wires may be, for example, a metal material such as an iron-based material or an aluminum-based material. The resin wires may be, for example, reinforced fibers having superior insulation properties and shear resistance such as a para-aramid fiber. The braided member 70 of the present embodiment is formed by braiding metal wires of an aluminum alloy into a tubular shape.

The braided member 70 collectively covers the electric wires 30 extending out of the housing 40. One end of the braided member 70 in the longitudinal direction covers the outer side of the end 61*a* of the bracket 60.

Structure of Crimping Ring 80

The crimping ring 80 is annular and surrounds the outer surface of the end 61*a* of the bracket 60. The material of the crimping ring 80 may be a metal material such as an iron-based material, a copper-based material, or an aluminum-based material. The crimping ring 80 of the present embodiment is formed of an aluminum alloy.

The crimping ring 80 is crimped to the end 61*a* of the bracket 60 in a state sandwiching the braided member 70 with the outer surface of the end 61*a* to fix the braided member 70 to the end 61*a* of the bracket 60. This electrically connects the braided member 70 and the bracket 60.

Structure of Fixing Member 90

As shown in FIG. 1, the fixing member 90 is, for example, a tape member. The fixing member 90 includes an adhesive layer on one surface in the thickness direction. The fixing member 90 is wound around the outer surface of the braided member 70 multiple times with the adhesive layer facing inward. The braided member 70 is pressed against the electric wires 30 by the fixing member 90. This fixes the braided member 70 to the electric wire 30.

Assembly of Wire Harness 10

When the wire harness 10 is coupled to the case 100, the insertion portion 44 of the housing 40 is first inserted into the opening 101 of the case 100.

Next, the terminals 20 are electrically connected to the mating terminals 110 by the bolts 111.

Then, the fixing portion 55 of the shield shell 50 is fixed to the female threaded portion 102 of the case 100 by the bolts 57. The bracket 60, to which the braided member 70, is attached to the shield shell 50 in advance.

In this manner, the wire harness 10 is coupled to the case 100.

The operation of this embodiment will be described.

The projecting piece 64 of the bracket 60 is located at the side of the holder 43 of the housing 40 opposite to the shield shell 50 so that the holder 43 is in between. Thus, the projecting piece 64 easily restricts pivoting of the housing 40 about the bracket 60. More specifically, displacement of the shield shell 50 relative to the housing 40 is restricted.

The advantages of the embodiment will now be described.

(1) The wire harness 10 includes the terminals 20 arranged next to one another, the electric wires 30 connected to the terminals 20, and the resin housing 40. The housing 40 includes the hood 42 including the opening 41 in which the terminals 20 are exposed, and the holder 43 projecting from the hood 42 and holding the terminals 20 and the electric wires 30. The wire harness 10 also includes the metal shield shell 50 that covers the holder 43 and is fixed to the case 100 of the device, and the metal bracket 60 that covers the holder 43 and is attached to the shield shell 50. The shield shell 50 is open toward the case 100 and covers the side of the holder 43 opposite to the case 100. The bracket 60 includes the tubular portion 61 into which the holder 43 is inserted, and the projecting piece 64 that projects from the tubular portion 61 toward the hood 42 at the side of the holder 43 opposite to the shield shell 50 so that the holder 43 is located in between.

Such a structure limits decreases in working efficiency when attaching the wire harness 10.

(2) The projecting piece 64 extends across the terminals 20 in the arrangement direction.

With such a structure, each terminal 20 is covered by the projecting piece 64 at a portion of the holder 43 facing the case 100, that is, a portion exposed from the shield shell 50. This improves the electromagnetic shielding property of the wire harness 10.

(3) Each terminal 20 includes the insertion hole 23 which extends through the terminal 20 in the Z-axis direction for insertion of the bolt 111 used for connection to the corresponding mating terminal 110.

Connection of the terminal 20 and the mating terminal 110 with the bolt 111 fastens the bolt 111, inserted into the terminal 20, to the mating terminal 110 and produces a force acting on the terminal 20 toward the mating terminal 110. Thus, the housing 40, holding the terminals 20, acts to move away from the shield shell 50. Nevertheless, with the present embodiment, the projecting piece 64 of the bracket 60 is located at the side of the holder 43 of the housing 40 opposite to the shield shell 50 so that the holder 43 is in between. This effectively restricts pivoting of the housing 40 about the bracket 60.

(4) The wire harness 10 includes the braided member 70 formed by braiding conductive wires. The braided member 70, which covers the periphery of the electric wires 30, is attached to the bracket 60.

With such a structure, the braided member 70 covers the periphery of the electric wires 30 and electromagnetically shields the electric wires 30.

(5) The wire harness 10 includes the fixing member 90 that fixes the braided member 70 to the electric wires 30.

With such a structure, the braided member 70 is fixed to the electric wires 30 by the fixing member 90. Here, the electric wires 30 are held by the housing 40, and the braided member 70 is attached to the bracket 60, which is attached to the shield shell 50. Thus, the housing 40 and the shield shell 50 are coupled to each other by the electric wires 30, the braided member 70, and the bracket 60. This limits displacement of the shield shell 50 relative to the housing 40. Therefore, decreases in working efficiency when attaching the wire harness 10 are further limited.

Modified Example

The present embodiment can be modified and practiced as described below. The present embodiment and the following modified examples can be implemented in combination with each other as long as there is no technical contradiction.

The fixing member 90 is not limited to the tape member, and may be, for example, a tying band that fastens the braided member 70 to the electric wire 30.

The fixing member 90 can be omitted from the wire harness 10.

The wire harness 10 may include braided members 70 that individually cover the outer periphery of the electric wires 30. In this case, the fixing member 90 may collectively fix the braided members 70 to the electric wires 30, or may individually fix the braided members 70 to the electric wires 30.

The braided member 70 may cover part of the periphery of the electric wires 30. The braided member 70 may have, for example, the form of a sheet and cover the electric wire 30 only from the side opposite to the case 100.

The braided member 70 can be omitted from the wire harness 10. In this case, the electric wires 30 may be, for example, shielded electric wires each having an electromagnetic shielding property.

Although the hood 42 of the embodiment described above includes the opening 41 extending through the hood 42 in the Z-axis direction, the hood 42 may include the opening 41 that is open only in the insertion portion 44. In this case, for example, a pin-shaped male terminal with a distal end extending from the interior of the hood 42 toward an opening of the insertion portion 44 can be employed as the terminal 20. As the mating terminal 110, a female terminal into which a male terminal is inserted can be used.

The projecting piece 64 may extend entirely over the terminal 20A and the terminal 20B in the X-axis direction.

The projecting piece 64 may extend over part of only one terminal 20 in the X-axis direction.

The opening 101 of the case 100 of the embodiment may be referred to as an attaching hole. The Z-axis direction of the embodiment may be referred to as an attaching direction of the insertion portion 44 with respect to the opening 101 of the case 100. The Y-axis direction of the embodiment may be referred to as an extending direction of the electric wires 30. The terminals 20 of the embodiment may each be referred to as a plate-shaped terminal including the plate-shaped wire connection portion 21 and the plate-shaped terminal connection portion 22. The housing 40 may hold the terminals 20 so that the terminal connection portions 22 of the terminals 20 are spread parallel to a single common hypothetical plane (for example, the XY plane). Each electric wire 30 of the embodiment may include a first length portion including a distal end, a second length portion continuous with the first length portion, and a third length portion continuous with the second length portion and extending out of the housing 40 in an electric wire extending direction (Y-axis direction), which is orthogonal to or intersects the attaching direction. The wire connection portion 21 of each terminal 20 may be connected to the first length portion of a corresponding one of the electric wires 30. As shown in FIG. 4, the holder 43 of the housing 40 may have a low profile. As shown in FIG. 3, the holder 43 of the housing 40 may include a first surface facing the outer surface of the electrical device case 100 and a second surface opposite to the first surface. The holder 43 of the housing 40 of the embodiment may include a first tubular portion contacting and surrounding the wire connection portion 21 of each terminal 20 and the first length portion of each electric wire 30, and a second tubular portion contacting and surrounding the second length portion of each electric wire 30. The second tubular portion may not contact and surround the wire connection portion 21 of the terminal 20 and the first length portion of the electric wire 30. The tubular portion 61 of the bracket 60 of the embodiment may be referred to as a metal tube. The projecting piece 64 of the bracket 60 of the embodiment may be referred to as a metal support plate or a metal tongue linearly extending from an open end of the tubular portion 61 in the longitudinal direction of the tubular portion 61 so as to support the first surface of the first tubular portion of the holder 43, which faces the case 100.

In the illustrated embodiment, the holder 43 has a low profile. Thus, the holder 43 has a relatively low bending rigidity in a certain direction that is orthogonal to or intersects the extending direction (Y-axis direction) of the electric wires 30 from the holder 43, for example, a first predetermined direction that may be the Z-axis direction. Further, the holder 43 has a relatively high bending rigidity in another direction that is orthogonal to or intersects the extending direction (Y-axis direction) of the electric wires 30 from the holder 43, for example, a second predetermined direction that may be the X-axis direction. Here, the tubular portion 61 of the bracket 60 surrounds the second tubular portion of the holder 43, which does not correspond to the wire connection portion 21 of each terminal 20. This limits bending deformation of the second tubular portion of the holder 43 in the first predetermined direction, which may be the Z-axis direction. The shield shell 50 covers the second surface of the first tubular portion of the holder 43, which corresponds to the wire connection portion 21 of each terminal 20. The second surface is opposite to the first surface, which faces the case 100. This limits bending deformation of the first tubular portion of the holder 43 away from the case 100 in the Z-axis direction. The projecting piece 64 of the bracket 60 extends along the first surface of the first tubular portion of the holder 43, corresponding to the wire connection portion 21 of each terminal 20 and facing the case 100, and is adjacent to or covers the first surface. This limits bending deformation of the first tubular portion of the holder 43 toward the case 100 in the Z-axis direction.

The present disclosure includes the following aspects. The components of the exemplary embodiments may be labeled with reference numerals of the illustrated embodiments as an aid to understanding and not for purposes of limitation. Some of the items described in the following aspects may be omitted, or some of the items described in the aspects may be selected or extracted and combined.

[Embodiment 1] One aspect of the present disclosure is directed to a wire harness (10) configured to be attached to an attachment hole (101) formed in an outer surface of an electrical device case (100), the wire harness (10) including:

electric wires (30), each including a first length portion including a distal end, a second length portion continuous with the first length portion, and a third length portion continuous with the second length portion;

plate-shaped terminals (20), each including a plate-shaped wire connection portion (21) that is in mechanical contact and electrically connection with the first length portion of a corresponding one of the electric wires (30):

a housing (40);

a metal shield shell (50); and a metal bracket (60), where:

the housing (40) may be a synthetic resin one-piece component including
- a tubular insertion portion (44) configured to be attached to the attachment hole (101) of the electrical device case (100) in an attaching direction (Z), and
- a holder (43) holding the plate-shaped wire connection portions (21) of the plate-shaped terminals (20) and the first length portions and the second length portions of the electric wires (30) so that the plate-shaped wire connection portions (21) are spread parallel to a single common hypothetical plane (XY plane) orthogonal to or intersecting the attaching direction (Z) and so that the third length portions of the electric wires (30) extend in an electric wire extending direction (Y-axis direction) orthogonal to or intersecting the attaching direction (Z);

the holder (43) of the housing (40) may have a low profile and include a first surface configured to face an outer surface of the electrical device case (100) and a second surface opposite the first surface;

the holder (43) of the housing (40) may include a first synthetic resin tubular portion contacting and surrounding the plate-shaped wire connection portions (21) and the first length portions of the electric wires (30), and a second synthetic resin tubular portion contacting and surrounding the second length portions of the electric wires (30) but not contacting and surrounding the plate-shaped wire connection portions (21) and the first length portions of the electric wires (30);

the metal shield shell (50) covers the second surface of the first synthetic resin tubular portion of the holder (43) but does not cover the first surface of the first synthetic resin tubular portion of the holder (43), and the metal shield shell (50) may not cover the second synthetic resin tubular portion of the holder (43); and the metal bracket (60) may include
- a metal tube (61) that covers the first surface and the second surface of the second synthetic resin tubular portion of the holder (43), and
- a metal tongue (64) that extends along the first surface of the first synthetic resin tubular portion of the holder (43) to restrict bending of the first synthetic resin tubular portion of the holder (43) in the attaching direction (Z).

[Embodiment 2] In one aspect of the present disclosure, in a vertical cross-sectional view (FIG. 2) of the wire harness (10), the metal tongue (64) may have a length in the electric wire extending direction (Y-axis direction) that is substantially the same as that of the plate-shaped wire connection portions (21).

[Embodiment 3] In one aspect of the present disclosure, the plate-shaped terminals (20) may include the plate-shaped terminal connection portions (22) that are spread parallel to the single common hypothetical plane (XY plane).

[Embodiment 4] In one aspect of the present disclosure, the metal shield shell (50) may be in direct contact with the electrical device case (100) to be electrically connected to the electrical device case (100), and the metal bracket (60) may be electrically connected to the electrical device case (100) via the metal shield shell (50).

DESCRIPTION OF THE REFERENCE CHARACTERS

10) wire harness
20) terminal
20A) terminal
20B) terminal
21) wire connection portion
22) terminal connection portion
23) insertion hole
30) electric wire
31) wire core
32) insulating coating
40) housing
41) opening
42) hood
43) holder
44) insertion portion
45) flange
46) sealing member
50) shield shell
51) attachment portion
52) threaded hole
53) enclosing portion
53*a*) peripheral wall
53*b*) top wall
54) insertion hole
55) fixing portion
56) insertion hole
57) bolt
60) bracket
61) tubular portion
61*a*) end portion
62) attachment portion
63) insertion hole
64) projecting piece
65) bolt
70) braided member
80) crimping ring
90) fixing member
100) case
101) opening
102) female threaded portion
110) mating terminal
111) bolt

The invention claimed is:

1. A wire harness, comprising:

terminals arranged next to one another and electrically connected to mating terminals arranged on a device;

electric wires connected to the terminals;

a resin housing including a hood and a holder, the hood including an opening in which the terminals are exposed, and the holder projecting from the hood toward an outer side of the hood and holding the terminals and the electric wires;

a metal shield shell covering the holder and fixed to a case of the device;

a metal bracket covering the holder and attached to the shield shell, wherein the shield shell is open toward the case and covers a side of the holder opposite to the case, and the bracket includes a tubular portion into which the holder is inserted, and a projecting piece arranged on the radially inner side of the tubular portion and projecting from the tubular portion toward the hood at a side of the holder opposite to the shield shell so that the holder is located between the projecting piece and the shield shell.

2. The wire harness according to claim 1, wherein the terminals are arranged next to each other in an arrangement direction, and the projecting piece extends across the terminals in the arrangement direction.

3. The wire harness according to claim 1, wherein each of the terminals includes an insertion hole that extends through the terminal in an opening direction of the opening for insertion of a bolt used for connection with a corresponding one of the mating terminals.

4. The wire harness according to claim 1, comprising:

a braided member formed by braiding conductive wires, wherein the braided member covers a periphery of the electric wires and is attached to the bracket.

5. The wire harness according to claim 4, comprising:

a fixing member that fixes the braided member to the electric wires.

6. The wire harness according to claim 1, wherein the projecting piece extends in a longitudinal direction of the tubular portion from an inner part of the tubular portion beyond an open end of the tubular portion and out of the tubular portion.

7. The wire harness according to claim 1, wherein the holder of the housing includes a first surface facing an outer surface of the case and a second surface opposite to the first surface, and the projecting piece is a metal support plate linearly extending in a longitudinal direction of the tubular portion to support the first surface of the holder.

* * * * *